W. E. GOLDSWORTHY.
COMBINED CARRIER FOR A SPEEDOMETER, LICENSE PLATE, SIGNAL, AND TIRES.
APPLICATION FILED JUNE 5, 1916.
1,209,427.   Patented Dec. 19, 1916.
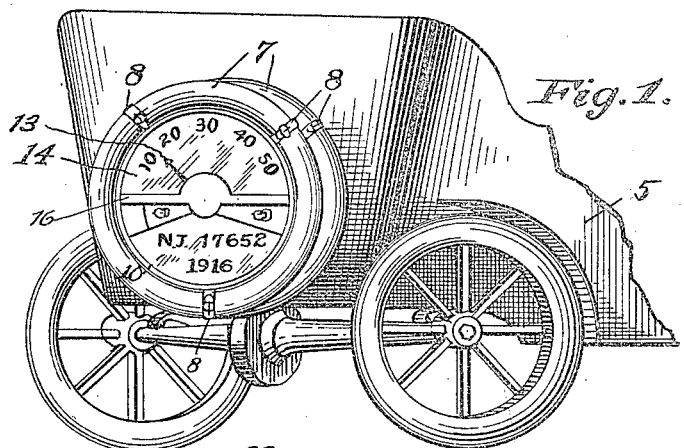
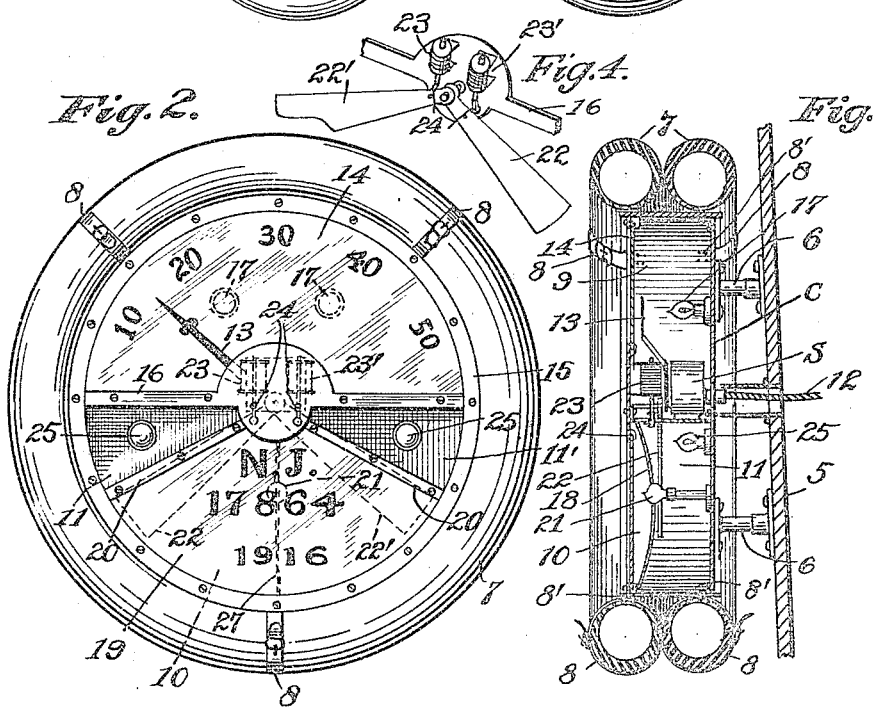
Inventor
W. E. Goldsworthy,
By his Attorney John O. Seifert

UNITED STATES PATENT OFFICE.

WALTER E. GOLDSWORTHY, OF DOVER, NEW JERSEY.

COMBINED CARRIER FOR A SPEEDOMETER, LICENSE-PLATE, SIGNAL, AND TIRES.

1,209,427.  Specification of Letters Patent.  Patented Dec. 19, 1916.

Application filed June 5, 1916. Serial No. 101,859.

*To all whom it may concern:*

Be it known that I, WALTER E. GOLDSWORTHY, a citizen of the United States, residing in Dover, in the county of Morris and State of New Jersey, have invented a new and useful Combined Carrier for a Speedometer, License-Plate, Signal, and Tires, of which the following is a specification.

This invention relates to a combined speed indicator, commonly termed a speedometer, a symbol-carrier to serve as a "license plate" for a motor vehicle, a signal device to indicate whether the vehicle is going to the right or left, and which is also adapted to serve as a carrier for a tire or tires.

It is an object of the invention to provide a casing in which to carry a speedometer mechanism, a part of one end of which casing is adapted to coöperate with the pointer of such mechanism to serve as an indicating dial upon which to indicate the rate of travel of the vehicle, and another portion of said end provided with symbols, such as letters and numerals, to serve as a license plate for a motor vehicle, and to provide said casing with means to carry a tire or tires.

It is a further object of the invention to provide a device of this character in which the end constituting the indicating dial for a speedometer and a license plate consists of transparent material and the casing is provided with means to illuminate the interior thereof.

Another object of the invention is to so arrange the casing and provide means within the same whereby to also adapt the device as a semaphore signaling means.

In the drawing accompanying and forming a part of this specification Figure 1 is a perspective view of a portion of a motor vehicle looking at the rear with an embodiment of my invention applied thereto. Fig. 2 is a front elevation of my improved device. Fig. 3 is a sectional side elevation; and Fig. 4 is a perspective view looking at the rear of semaphore signaling arms and means to actuate the same.

Similar characters of reference designate like parts throughout the different views of the drawing.

The embodiment of my invention shown in the drawing consists of a casing (designated in a general way by C) adapted to be secured to the body 5 of a vehicle, preferably in the rear thereof, as shown in Fig. 1, by brackets 6. The casing is preferably circular in form and of a size to readily engage within the inner circumference of a tire or tires 7 and has means, such as straps 8, fixed thereto and which straps are adapted to engage around the tire or tires, to secure the same to the casing and whereby the casing will serve as a carrier for said tires.

The casing is separated into compartments 9, 10, 11 and 11', all of which compartments open into one end of the casing and which may be considered as the front end. The compartment 9 which consists substantially of the upper half of the casing is adapted to serve as a means to indicate to any one the speed or rate of travel of the vehicle and for this purpose this compartment is provided with a suitable speedometer mechanism, (designated in a general way by S) supported upon the transverse wall which separates said compartment from the other compartments of the casing and which is actuated in the usual manner from a traction wheel of the vehicle by a flexible shaft 12. The speedometer mechanism in the present instance is located adjacent the rear end of the compartment 9 and has an enlarged indicating pointer 13 bent so that the point will lie adjacent the front wall 14 of the compartment 9. This front wall 14 is of transparent material, such as glass, and is retained in place by an annular member 15 removably secured to the casing and a transverse member 16 removably secured to the front edge of the transverse separating partition of the compartment 9. This transparent end 14 has opaque digits 10 to 60 circumferentially disposed as indicated whereby said end 14 will coöperate with the pointer 13 as an indicating dial. The pointer is also of a color whereby it will be readily discernible in the day time through the transparent end 14. To adapt this indicating mechanism for use at night means are provided to illuminate the interior of the compartment 9 and as shown consists of an electric light bulb 17 connected in circuit with a source of electric current, such as a storage battery, (not shown).

It will be obvious that during the travel of the vehicle the speedometer mechanism will be actuated in the usual manner and it will be readily discernible from the rear of the vehicle the rate of travel of the vehicle and thus indicate to the driver of a vehicle in the rear when the vehicle immediately ahead is slowing down and thus avoid collision.

As stated the casing is also adapted to serve as a "license plate" for a vehicle, for which purpose the casing is provided with a partition 18 below the transverse partition for the compartment 9 and opening into the front end of the casing to form the compartment 10, the partition being of segmental form looking at the face with the edges lying adjacent the front end of the casing and the forward end closed by a segmental plate 19 of transparent material, such as glass, having opaque symbols thereon such as letters and numerals to indicate the registration number of the vehicle, the State in which the vehicle is registered, and the year, as shown in Figs. 1 and 2, this segmental plate being held in place by the annular member 15 and members 20 removably secured to the edge of the partition 18. These symbols are of a character to be readily discernible in the day time and to make these symbols discernible at night the interior of the compartment 10 is illuminated as by an electric light bulb 21 also connected to the source of electric current, such as a storage battery. This light 21 is preferably located substantially centrally of the partition 18 and the partition serves as a reflector to deflect the light rays through the plate 19.

To adapt the device as a means to signal to any one in the rear, such as the occupant of another vehicle, as to whether the vehicle is going to turn to the right or left, the casing is provided with semaphore signaling means. For signaling in the day time a pair of semaphore arms 22, 22' are pivotally supported respectively in the compartments 11, 11'. These compartments 11, 11' are formed by a perpendicular partition or wall 27 substantially central of the casing extending from the back of the casing to the rear of the partition 18 and below the transverse partition for the compartment 9 and which compartments have a segmental opening in the front of the casing substantially of a formation and size the same as the semaphore arms, as clearly shown in Figs. 1 and 2. The semaphore arms normally occupy the dotted line position shown in Fig. 2 away from the open end of the compartments 11, 11'. Either one or both of these semaphore arms are adapted to be moved to a position to be exposed through the open ends of the compartments 11, 11' and maintained in such position by electro-magnetic means, consisting of electro-magnets 23, 23' of the solenoid type to the filament or core of which magnets the arms are connected as at 24, the said magnets being connected with a source of electricity, such as a battery, and placed in circuit therewith by push buttons (not shown) operable from a suitable place adjacent the driver of the vehicle, such for instance as the steering wheel, whereby the magnets may be placed at will in circuit with the source of electricity to energize the magnets. When a magnet is energized its connected semaphore arm will be moved to a position to be exposed and maintained in such position so long as the magnet is energized, and as soon as the circuit is opened by the release of the push button, the connected arm will drop by its own weight away from the open end of the compartment in which it is located. To indicate that the vehicle is about to stop both of the semaphore arms may be exposed to view by energizing both of the magnets.

To utilize the device as a signaling means at night an electric light bulb 25 of red glass is located in each of the compartments 11, 11' which are connected by normally open circuits with a source of electric current, such as the battery to which the bulbs 17, 21 and the magnets are connected, and which circuits are adapted to be closed by push buttons (not shown). The bulbs 25 may be in the same circuits as the magnets, suitable means being provided to cut either the bulbs or the magnets out of the circuits and the other into the circuits.

Having thus described my invention I claim:—

1. A casing adapted to carry a speedometer mechanism, one end of the casing being arranged to constitute a combined indicating dial for the speedometer and a symbol carrier, and said casing adapted to fit within a tire and serve as a carrier therefor, substantially as and for the purpose specified.

2. A casing adapted to carry a speedometer mechanism, one side of said casing being arranged to serve as an indicating dial for the speedometer, and said casing adapted to fit within the inner circumference of a tire, and means to secure and carry a tire on the exterior of the casing, substantially as and for the purpose specified.

3. A circular casing adapted to carry a speedometer mechanism, one end of said casing having transparent means to serve as an indicating dial for the speedometer, and said casing adapted to engage within the inner circumference of a tire to serve as a carrier therefor, and means to illuminate the interior of the casing, substantially as and for the purpose specified.

4. A casing adapted to carry a speedometer mechanism, transparent means in one end of said casing constituting an indicating dial for the speedometer, and a symbol carrying plate, and said casing adapted to engage within the inner circumference of a tire and serve as a carrier for a tire, substantially as and for the purpose specified.

5. The combination of a casing adapted to carry a speedometer mechanism, transparent means on one end of said casing to constitute an indicating dial for the speedometer, and a symbol carrying plate, and semaphore signaling means carried by said casing, substantially as and for the purpose specified.

6. The combination of a casing separated into compartments, a speedometer mechanism carried in one of said compartments; a transparent closure for one of said compartments constituting an indicating dial for the speedometer; a transparent closure for another compartment to constitute a symbol carrier; and means to illuminate the interior of said compartments, substantially as and for the purpose specified.

7. The combination of a casing separated into a plurality of compartments, one of said compartments being adapted to carry a speedometer and having a transparent closure at one end to serve as an indicating dial for said mechanism; a transparent closure at the end of another compartment having symbols thereon; and semaphore signaling means carried by the other compartments and adapted to be exposed through the open ends of said compartments, substantially as and for the purpose specified.

8. The combination of a casing separated into a plurality of compartments, one of said compartments being adapted to carry a speedometer mechanism and having a transparent closure at one end to serve as an indicating dial for said mechanism; a transparent closure at the end of another compartment carrying opaque symbols thereon; means to illuminate the interior of both of said compartments; and semaphore signaling means carried by the other compartments adapted to be exposed through the open ends of said compartments, substantially as and for the purpose specified.

9. The combination of a casing separated into a plurality of compartments having one end terminating in one end of the casing; a speedometer mechanism adapted to be carried in one of said compartments having an indicating pointer; a transparent closure for the open end of said compartment to coöperate with the pointer of the speedometer mechanism as an indicating dial; a transparent closure at the end of another compartment carrying symbols thereon; and pivoted semaphore arms carried in the other compartments adapted to be exposed through the open ends of said compartments, substantially as and for the purpose specified.

10. The combination of a casing separated into a plurality of compartments having one end terminating in the one end of the casing; a speedometer mechanism adapted to be carried in one of said compartments having an indicating pointer; a transparent closure for the end of said compartment to coöperate with the pointer of the speedometer mechanism as an indicating dial; a transparent closure at the end of another compartment having opaque symbols thereon; semaphore arms pivotally carried in the other compartments; and electro-magnetic means to move said semaphore arms to a position to be exposed through the open ends of said compartments and maintain said arms in such position, substantially as and for the purpose specified.

11. The combination of a casing separated into four compartments having one end terminating in one end of the casing; a speedometer mechanism having an enlarged indicating pointer carried in one of said compartments; a transparent closure for said compartment in the end opening into the one end of the casing whereby said closure will coöperate with said pointer as an indicating dial; a transparent closure for the end of another compartment opening into the one end of the casing having symbols thereon; semaphore arms pivotally carried in the other two compartments to normally occupy a position away from the ends opening into the one end of the casing; an electro-magnet for each of said semaphore arms to move said arms to a position to be exposed through the open ends of said compartments opening into the one end of the casing and maintain them in such position; and illuminating means for the interior of each of the compartments, substantially as and for the purpose specified.

12. The combination of a circular casing separated into four compartments having one end terminating in one end of the casing; a speedometer mechanism having an enlarged indicating pointer carried in one of said compartments; a transparent closure for said compartment in the end opening into the one end of the casing whereby said closure will coöperate with said pointer as an indicating dial; a transparent closure for the end of another compartment opening into the one end of the casing having symbols thereon; semaphore arms pivotally carried in the other two compartments to normally occupy a position away from the ends opening into the one end of the casing; an electro-magnet for each of said semaphore arms to move said arms to a position to be exposed through the open ends of said compartments opening into the one end of the casing and maintain them in such position; and illuminating means for the interior of each of the compartments; said casing adapted to engage within the inner circumference of a tire and having means to secure and carry a tire on the exterior of the casing, substantially as and for the purpose specified.

13. A casing adapted to engage within the inner circumference of a tire and serve as a carrier therefor, and semaphore signaling means carried by said casing.

14. A casing adapted to engage within the inner circumference of a tire and serve as a carrier therefor and one end constituting a symbol carrying plate, and semaphore signaling means carried by the casing.

WALTER E. GOLDSWORTHY.